United States Patent [19]
Okisu

[11] Patent Number: 6,091,862
[45] Date of Patent: Jul. 18, 2000

[54] PIXEL INTERPOLATION DEVICE AND PIXEL INTERPOLATION METHOD

[75] Inventor: Noriyuki Okisu, Osakasayama, Japan

[73] Assignee: Minolta Co., Ltd., Osaka, Japan

[21] Appl. No.: 08/972,807

[22] Filed: Nov. 19, 1997

[30] Foreign Application Priority Data

Nov. 26, 1996 [JP] Japan .................................. 8-314710

[51] Int. Cl.⁷ .................................................. G06K 9/32
[52] U.S. Cl. ........................................ 382/300; 382/269
[58] Field of Search .................................. 382/300, 299, 382/269, 266

[56] References Cited

U.S. PATENT DOCUMENTS

| | | | |
|---|---|---|---|
| 3,971,065 | 7/1976 | Bayer | 358/41 |
| 5,050,227 | 9/1991 | Furusawa et al. | 382/269 |
| 5,253,046 | 10/1993 | Shiraishi | 358/43 |
| 5,293,579 | 3/1994 | Stockholm | 382/269 |
| 5,382,976 | 1/1995 | Hibbard | 348/273 |
| 5,719,967 | 2/1998 | Sekine | 382/269 |
| 5,771,318 | 6/1998 | Fang et al. | 382/269 |
| 5,875,268 | 2/1999 | Miyake | 382/300 |

FOREIGN PATENT DOCUMENTS 7059098   3/1995   Japan .

*Primary Examiner*—Yon J. Couso
*Attorney, Agent, or Firm*—Sidley & Austin

[57] ABSTRACT

A method and apparatus for pixel interpolation performed on color separated image data which is obtained from a Bayer array or like sensor. The slopes of pixel values are computed in two or more directions and pixel weight factors are calculated corresponding to these directions based on the computed slopes. The pixel weight factors are used in the pixel interpolation calculation to improve the interpolated result such as is necessary in the edge region of an image.

18 Claims, 3 Drawing Sheets

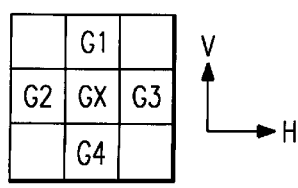
FIG. 4
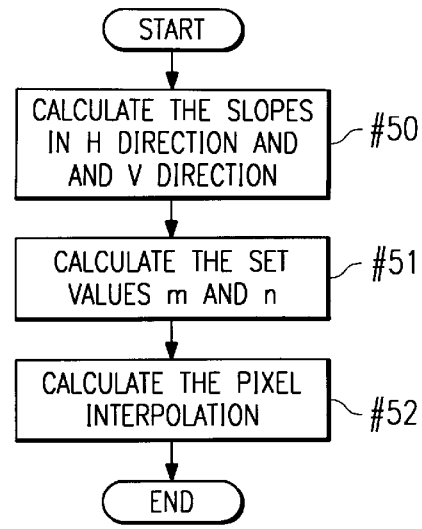
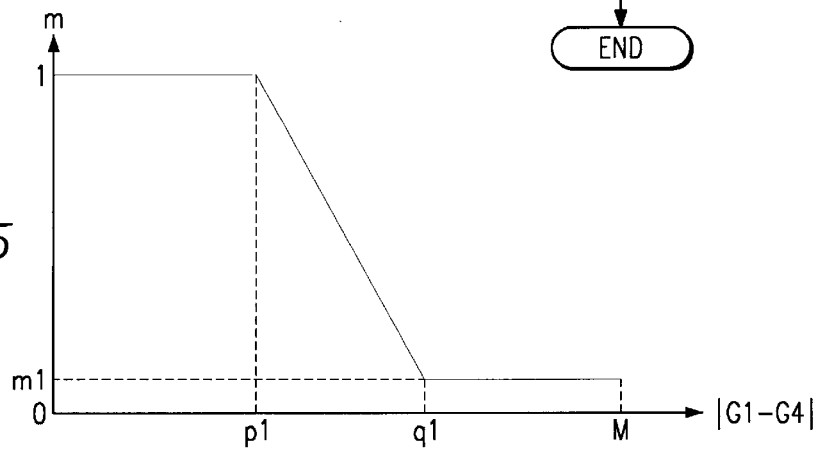
FIG. 5
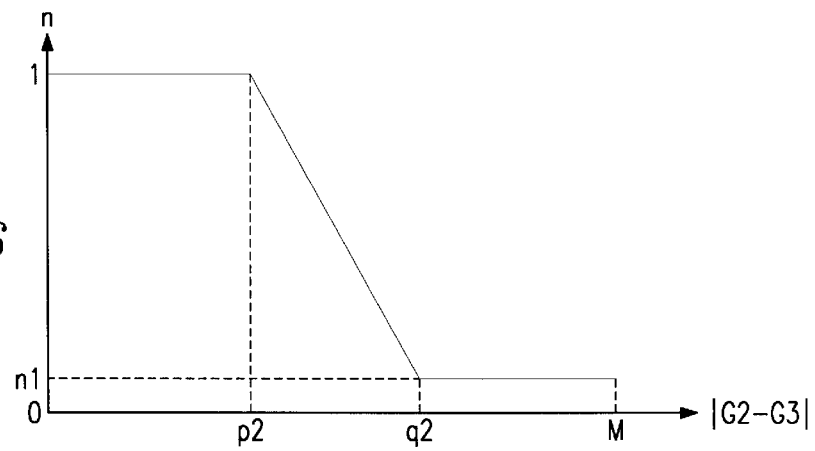
FIG. 6
FIG. 8
FIG. 9
FIG. 10

PIXEL INTERPOLATION DEVICE AND PIXEL INTERPOLATION METHOD

FIELD OF THE INVENTION

The present invention relates to a pixel interpolation device and pixel interpolation method to interpolate pixels of image data of a Bayer array type.

BACKGROUND OF THE INVENTION

Conventionally, pixel interpolation methods using a simple mean process have been used as pixel interpolation methods to interpolate pixels of image data obtained by analog-to-digital conversion of photographic data photographed by a charge-coupled device having pixels arranged in a Bayer array with an RGB filter.

In a Bayer array format, image data contains red (R), green (G), and blue (B) data at varying pixel locations based on a color filter array which overlies the sensor. Since the sensor does not provide image data for all three colors for each pixel, pixel interpolation is required to produce three full color image frames, one corresponding to each color.

FIG. 8 shows part of the G data of pixels in a green (G) data series produced by color separation. In FIG. 8, reference numbers G11, G12, G13, and G14 represent originally present pixels. Pixel GX is interpolated between pixels G11 through G14, and is referred to as an interpolated pixel. In the conventional simple mean method, the pixel value of the interpolated pixel GX is expressed by Equation (1) below.

$$GX=(G11+G12+G13+G14)/4 \quad (1)$$

In Equation (1), reference numbers G11 through G14, and GX represent the pixel value of pixels G11 through G14, and interpolation pixel GX.

In FIG. 8, when there is virtually no variation in luminance between the adjacent pixels, the pixel value of each pixel, G11 through G14, is 100, as shown in FIG. 9. Accordingly, the pixel value of the interpolated pixel GX normally also can be expected to be about 100. FIG. 9 illustrates the case of uniform luminance where the pixel value of the interpolated pixel GX calculated from Equation (1) is 100. In contrast to the situation of uniform luminance, FIG. 10 shows the edge portion of an image where the pixel values of pixels G11 through G13 are 100, but the pixel value of pixel G14 is 0. In this case, although the pixel value of the interpolated pixel GX should be about 100, since this is an edge portion of the image, the pixel value of the interpolated pixel GX calculated from Equation (1) is 75. As a result, the edge portion becomes jagged after pixel interpolation processing, and also results in the disadvantage of producing false color.

Thus, when using conventional pixel interpolation methods in the case of high frequency regions such as edge images and slit images, disadvantages arise such as image edge corruption, edge jaggedness, and false color. These disadvantages are particularly acute when pixel interpolation is performed by a simple mean method for the green (G) for a CCD having a Bayer array type pixel arrangement because there, the green (G) sampling frequency is twice the sampling frequency of the red (R) and blue (B).

A device which shows one method of eliminating this disadvantage is disclosed in Japanese Laid-Open Patent Application No. 7-59098. The disclosed device determines the slopes of pixel values in the image data in two directions, compares each slope to a predetermined threshold, and interpolates the missing pixel value based on pixel data in only one image direction based on the comparison of slopes. Unfortunately, however, when the pixel value slopes in a region are near the threshold value, interpolation calculations can switch back and forth between directions resulting in marked differences in interpolated values even when the image data has only slight fluctuations. Consequently, the condition of the image, including halftones, color matching, and edge shape may exhibit extreme variations.

SUMMARY OF THE INVENTION

It is the object of the present invention to provide a pixel interpolation device and pixel interpolation method capable of pixel interpolation without causing undue image edge corruption, and to reduce or eliminate the disadvantages of the prior art that have been described.

A further object of the present invention is to provide a pixel interpolation device and pixel interpolation method that does not cause image edge corruption or image edge jaggedness even when interpolating Bayer array type image data.

In one aspect of the invention a device is provided which calculates the slopes of pixel values in two or more directions within the image field, and which then calculates weighting factors which are applied to pixel values in each direction in computing an interpolated pixel value.

In a second aspect of the invention a device is provided which calculates slopes, as described above in the first aspect, and which calculates weighting factors that are functionally related to the calculated slopes and are approximately in inverse proportion to the slopes. These weighting factors are used in combination with the pixel data values to compute the value of the interpolated pixel.

In another aspect of the invention, a method of pixel interpolation is taught where pixel values within an image frame are evaluated for slope in two or more directions, and a weight factor for each direction is calculated based on the data value slope in that direction. The weight factors are then used in conjunction with the pixel data values to compute the value of an interpolated pixel.

In another aspect of the invention, a method of pixel interpolation is taught where the computation of weight factors is performed based on a predetermined functional relationship between pixel value slope and a corresponding weight factor.

BRIEF DESCRIPTION OF THE DRAWINGS

These and other objects and features of the present invention will become apparent from the following description of the preferred embodiments taken in conjunction with the accompanying drawings.

FIG. 4 shows part of the G data obtained by the color separation process.

FIG. 5 shows an example of set value "m" which is a function of pixel value slope.

FIG. 6 shows an example of set value "n" which is a function of pixel value slope.

FIG. 7 is a flow chart of the pixel interpolation process of G data by pixel interpolation unit 16.

FIG. 8 illustrates a possible layout of part of the G data as used in the interpolation process.

FIG. 9 shows a part of the G data where specific pixel values are included.

FIG. 10 shows a part of the G data in the region of an image edge.

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

Figure 1:
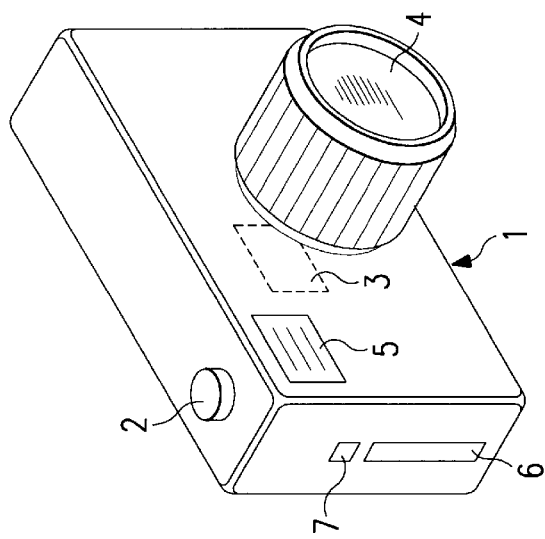
FIG. 1 is a perspective view of a digital camera provided with a pixel interpolation device.
Figure 2:
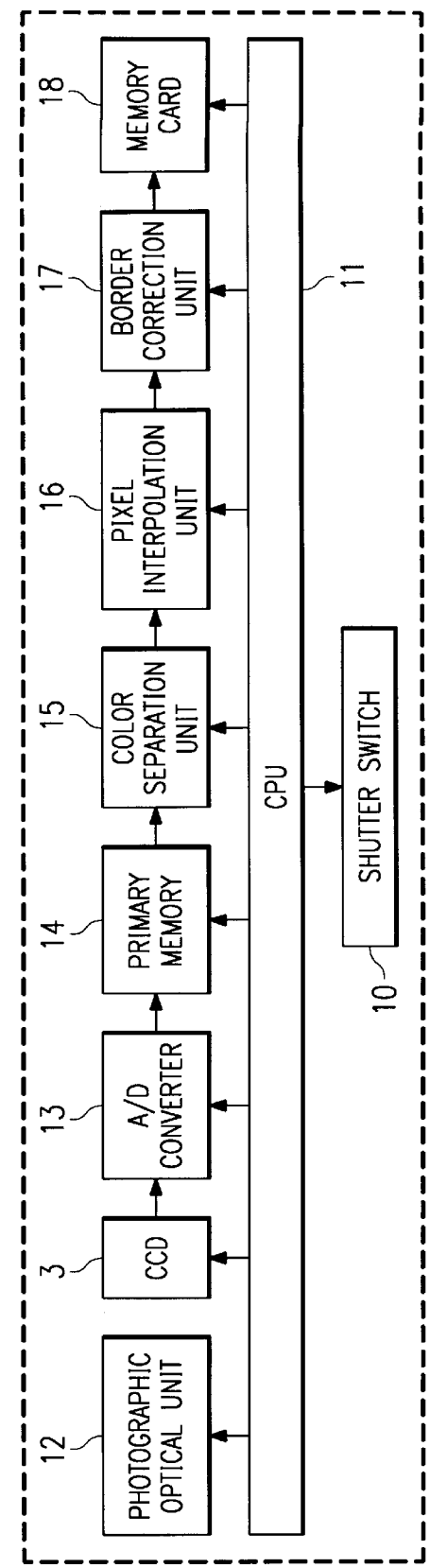
FIG. 2 is a block diagram of a digital camera provided with a pixel interpolation device.

FIG. 1 is a perspective view of a digital camera provided with a pixel interpolation device of the present invention. FIG. 2 is a block diagram of a digital camera provided with a pixel interpolation device of the present invention.

In FIG. 1, when the shutter button 2 of digital camera 1 is pressed, an image is formed on the internal photographic charge-coupled device (CCD) 3 via a photographic lens 4, and the light signals are converted to electric signals by CCD 3. Reference number 5 refers to a range finder window, and reference number 6 refers to a card insertion slot which receives and connects to an inserted memory card used to store image data obtained through predetermined processing of the electric signals converted by CCD 3. The memory card can be removed from the card insertion slot 6 by pressing a card release button 7. CCD 3 has a pixel array arranged in a Bayer array, and each pixel has RGB filters.

In FIG. 2, digital camera 1 is provided with a CCD 3, shutter switch 10 which is turned ON when a shutter button 2 is pressed, central processing unit (CPU) 11 to control various components and which starts a photographic operation when it detects shutter switch 10 is turned ON, photographic optical unit 12 comprising a photographic lens 4 and shutter and diaphragm devices, analog-to-digital (A/D) converter 13 to accomplish A/D conversion of electric signals converted by CCD 3, primary memory 14 to temporarily store image data subjected to A/D conversion by A/D converter 13, color separation unit 15 to separate colors of image data, pixel interpolation unit 16 to accomplish pixel interpolation of image data, border correction unit 17 to accomplish border correction of image data, and memory card 18 to store image data subjected to predetermined image processing. The pixel interpolation unit 16 includes a device for calculating pixel values, a device for calculating slopes of pixel values, and a device for interpolating pixel values.

When shutter button 2 is pressed and shutter switch 10 is turned ON, CPU 11 controls the photographic optical unit 12 so as to form an image on CCD 3, and the input image is converted to electric signals by CCD 3. The electric signals converted by CCD 3 are subjected to analog-to-digital conversion by A/D converter 13 to generate digital image data, and CPU 11 temporarily stores the image data in primary memory 14. CPU 11 reads out the image data temporarily stored in primary memory 14 and sends it to color separation unit 15 to where the color components are separated. The color separated image data are then subjected to pixel interpolation by pixel interpolation unit 16, to border correction by border correction unit 17, and the results are then stored in memory card 18.

Primary memory 14 is a buffer memory used to accommodate the difference between the speed of conversion of an image to electric signals by CCD 3 and A/D conversion by A/D converter 13, and the speed of image processing by color separation unit 15, pixel interpolation unit 16, and border correction unit 17 and storing data in memory card 18. Accordingly, primary memory 14 is unnecessary if the image processing speed of color separation unit 15, pixel interpolation unit 16, and border correction unit 17 and the speed of storing to memory card 18 are high speed.

Image data processing performed by color separation unit 15, pixel interpolation unit 16, and border correction unit 17 are described in fuller detail below.

Figure 3:
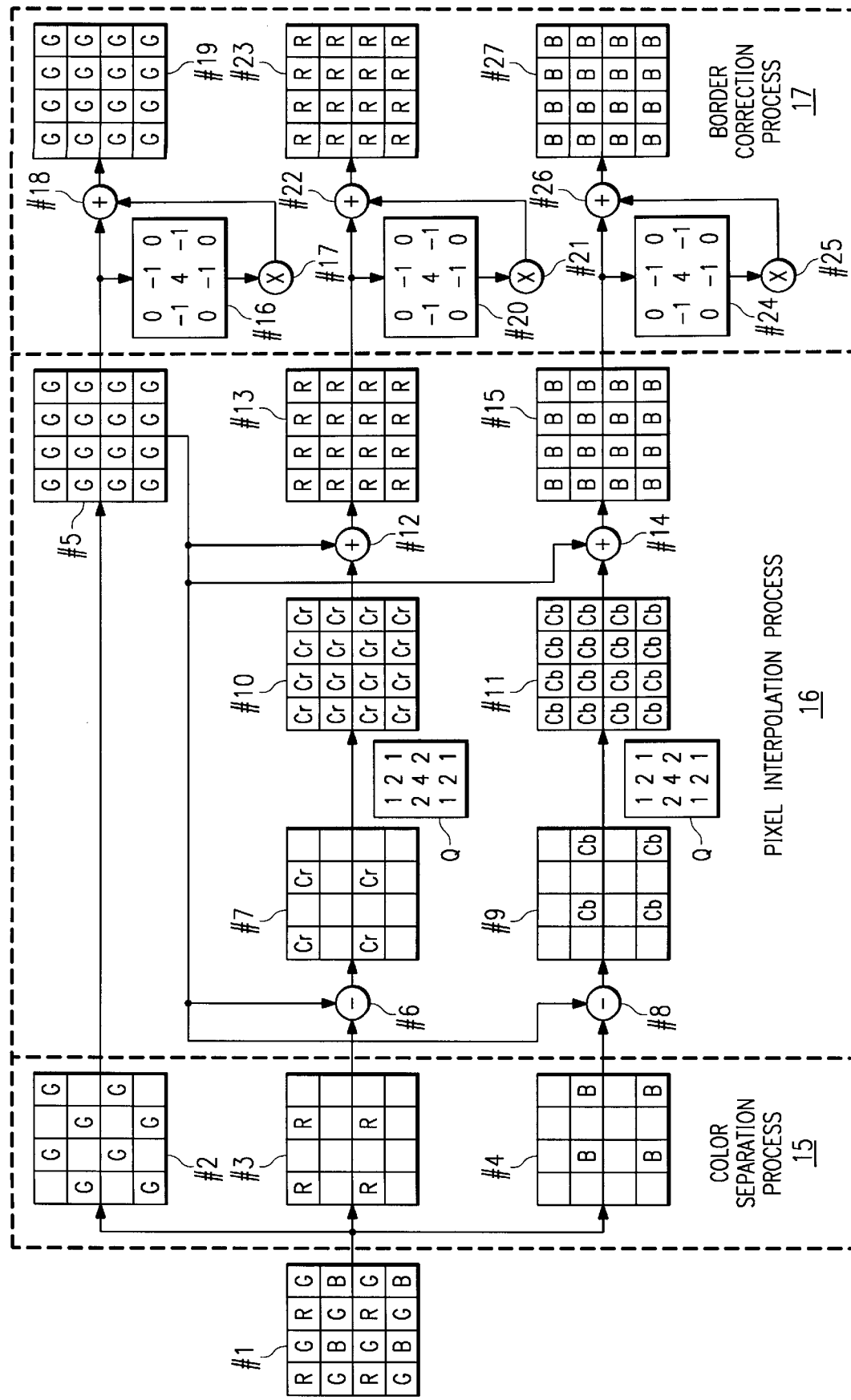
FIG. 3 illustrates the flow of image data processing.

FIG. 3 illustrates the image data processing flow accomplished by color separation unit 15, pixel interpolation unit 16, and border correction unit 17 shown in FIG. 2.

In FIG. 3, a photographed image is converted to Bayer array photographic analog data in the initial step #1 by CCD 3 which has a Bayer array type pixel array, and A/D converter 13 converts the CCD data to Bayer array digital data. The image data is stored in primary memory 14 after A/D conversion, and read out again from said primary memory 14 for the next processing step. In steps #2 through #4, color separation unit 15 separates the data series of each color red (R), green (G), blue (B) from the image data. Since the R, G and B color separated image arrays do not each contain a pixel value at every pixel location, pixel interpolation is necessary to provide a full image array of pixel values for each of the three colors.

In step #5, pixel interpolation unit 16 performs pixel interpolation on the G data using a pixel interpolation method which will be described later. After pixel-interpolation, the G data form a full image array of G values, some of which are used in the processing of the R and B data.

Pixel interpolation of the color separated R data array and B data array are described next. To process the R data array, each R pixel value has subtracted from it the G pixel value from the same corresponding image array location (Step #6). For R data array locations which do not contain an R pixel value, no subtraction occurs. Subtraction step #6 converts the R pixel data to a color difference data Cr for each pixel. Then, in step #7, the Cr data are held pending the next processing step.

Pixel interpolation of the B data proceeds in a manner similar to the above-described processing of the R data. To process the B data array, in step #8, each B pixel value has subtracted from it the G pixel value from the same corresponding image array location (Step #8). For B data array locations which do not contain a B pixel value, no subtraction occurs. Subtraction step #8 converts the B pixel data to a color difference data Cb for each pixel. Then, in step #9, the Cb data are held pending the next processing step.

Next, pixel interpolation unit 16 executes pixel interpolation by a simple mean process using a digital filter Q on the Cr data held in step #7 to produce pixel-interpolated Cr data (Step #10). The same process is performed on the Cb data held in step #9 to produce pixel-interpolation Cb data (Step #11). In step #12, the G data is added to the Cr data which converts the Cr data back to R data. The pixel interpolated and reconstituted R data are held in step #13, whereupon the R data pixel interpolation process ends. Similarly, in step #14, the G data is added to the Cb data which converts the Cb data back to B data. The pixel interpolated and reconstituted B data are held in step #15, whereupon the B data pixel interpolation process ends.

The border correction process is described next and is performed for each of the R, G and B image arrays. Starting first with the G image array, the high frequency components of the G data are extracted from the pixel-interpolated G data using a Laplacian filter in step #16. Then, border correction unit 17 multiplies the G data from which the high frequency component has been extracted by a predetermined gain, e.g., 0.3, in step #17. Next, in step #18, border correction unit 17 adds the gain-multiplied data obtained in step #17 to the original G data obtained in step #5 to generate border-corrected G data. The border-corrected G data are held in step #19 for further processing or output. The R and B data are processed for border correction using a like method.

In regard to the R data, the high frequency components of the R data are extracted from the pixel-interpolated R data using a Laplacian filter in step #20. Then, border correction unit 17 multiplies the R data from which the high frequency component has been extracted by a predetermined gain, e.g., 0.3, in step #21. Next, in step #22, the gain multiplied data obtained in step #21 are added to the original R data held in step #13 to generate border-corrected R data. The border-corrected R data are held in step #19 for further processing or output.

For the B data, the high frequency components of the B data are extracted from the pixel-interpolated B data using a Laplacian filter in step #24. Then, border correction unit 17 multiplies the B data from which the high frequency component has been extracted by a predetermined gain, e.g., 0.3, in step #25. Next, in step #26, the gain multiplied data obtained in step #24 are added to the original R data held in step #15 to generate border-corrected B data. The border-corrected B data are held in step #17 for further processing or output.

FIG. 4 illustrates the orientation of pixels in a part of the G data obtained by the color separation process in step #2 of FIG. 3. The pixel interpolation method executed by pixel interpolation unit 16 on the G data in step #5 of FIG. 3 is described below with reference to FIG. 4.

In FIG. 4, reference numbers G1, G2, G3, and G4 represent the originally present pixels, and a pixel GX is to be interpolated between the pixels G1 through G4. Thus, pixel GX is referred to as an interpolated pixel. The direction of pixels G2 and G3 is designated the H direction, e.g., a horizontal direction, and the direction of pixels G1 and G4 is designated the V direction, e.g., a vertical direction.

The image in FIG. 4 can be classified according to the categories (a) through (d) below based the characteristics of the image as follows:

| | |
|---|---|
| $\|G1-G4\|$ is large; $\|G2-G3\|$ is small | (a) |
| $\|G1-G4\|$ is small; $\|G2-G3\|$ is large | (b) |
| $\|G1-G4\|$ and $\|G2-G3\|$ are large | (c) |
| $\|G1-G4\|$ and $\|G2-G3\|$ are small | (d) |

The reference numbers G1, G2, G3, and G4 in $|G1-G4|$ and $|G2-G3|$ represent the pixel values of pixels G1 through G4, and the quantities $|G1-G4|$, $|G2-G3|$, etc. represent the size of the slope of pixel values in the direction of the indicated pixels. Each of the categories (a)–(d) corresponds to a characteristic image aspect. Category (a) corresponds to the edge of the image along the H direction, and category (b) to the edge of the image in the V direction. Category (c) corresponds to the corner of the image at interpolated pixel GX, and category (d) is characteristic of an image in the region of small luminance difference.

For pixel interpolation when category (a) applies, the weight of the pixel values G2 and G3 are increased during the pixel interpolation calculation, and the weight of the pixel values of G1 and G4 are reduced. The effect is to properly interpolate a pixel value consistent with the edge of the image in the H direction. When category (b) applies, the weight of the pixel values G2 and G3 are reduced and the weight of the pixel values of G1 and G4 are increased. The effect is to properly reproduce the edge of the image in V direction. When either category (c) or (d) applies, nearly equal weights are given to pixels G1 through G4 during pixel interpolation calculation.

The pixel value of the interpolated pixel GX is calculated using Equation (2) shown below.

$$GX=\{m^*(G1+G4)+n^*(G2+G3)\}/\{2^*(m+n)\} \quad (2)$$

In Equation (2), m is a variable coefficient whose value is set based on the value of $|G1-G4|$ which is the slope of the G data in the V direction. Similarly, n is a variable coefficient whose value is set based on the value of $|G2-G3|$ which is the slope of the G data in the H direction. In this expression, values m and n define the weights given to pixel values G1 through G4 in the process of interpolating pixel value GX. The method of setting set values m and n is described below.

FIG. 5 shows an example of set value m and its functional relationship to the value of $|G1-G4|$. In FIG. 5, p1, q, m1 and M are predetermined values. Referring now to the graph, when $0\leq|G1-G4|\leq p1$, the set value m is 1; and when $q\leq|G1-G4|\leq M$, the set value m is a constant m1. When $p1\leq|G1-G4|\leq q1$, the set value m changes so as to be inversely proportional to $|G1-G4|$ when exceeding m1 but less than 1. The value M is the maximum value of $|G1-G4|$ and $|G2-G3|$, e.g., M=100 when the image data range is in the range of 0 to 100. In this embodiment of the invention, the predetermined value p1 is 35, the predetermined value q1 is 65, and the predetermined value m1 is 0.01.

FIG. 6 shows an example of set value n and its functional relationship to the value of $|G2-G3|$. In FIG. 6, p2, q2 and n1 are predetermined values. In FIG. 6, when $0\leq|G2-G3|\leq p2$, the set value n is 1; and when $q2\leq|G2-G3|\leq M$, the set value n is a constant n1. When $p2\leq|G2-G3|\leq q2$, the set value n changes so as to be inversely proportional to $|G2-G3|$ when exceeding predetermined value n1 but less than 1. In this embodiment of the invention, the predetermined value of p2 is 35, the predetermined value q2 is 65, and the predetermined value n1 is 0.01.

FIG. 7 is a flow chart showing the pixel interpolation process of G data by pixel interpolation unit 16. The flow of FIG. 7 is described by way of an example of the interpolation method used to determine interpolated pixel GX in the G data of FIG. 4. In FIG. 7, pixel interpolation unit 16 calculates the slope of $|G2-G3|$ expressing the slope of G data in the H direction and calculates the slope of $|G1-G4|$ expressing the slope of G data in the V direction in step #50, and thereafter calculates the set values m and n from the functions illustrated in FIGS. 5 and 6 in step #51. Then, pixel interpolation unit 16 executes the pixel interpolation calculation to calculate the pixel value of interpolated pixel GX from Equation (2), whereupon this flow ends. This pixel interpolation process is then executed for all other G data, and this G data pixel interpolation process ends.

The above-described pixel interpolation process effectively determines the pixel value of interpolated pixel GX whether GX is within an image area or at the edge. As an example, the above described process when applied to the G data shown in FIG. 9 computes an interpolated pixel value of 100, and when applied to the data of FIG. 10 computes an interpolated pixel value is 99.5.

Although the slope of the G data is calculated using the pixel values of two pixels circumscribing the interpolated pixel GX in the aforesaid embodiment, it is to be understood that the present invention is not limited to this arrangement. The mean slope may be calculated using the pixel values of two pixels or three pixels adjacent to the interpolated pixel GX, and the slope of G data may be understood to be in two optional directions near the interpolated pixel GX. The pixel interpolation process device of the present invention has been described using the example of G data in the aforesaid embodiments. It is to be noted that the interpolation process in the device of the present invention may be accomplished using R data and B data as well. Since the pixel interpolation process for R data and B data is identical to that for G data, these examples have been omitted from the discussion.

The pixel interpolation device of the embodiments described above accomplishes pixel interpolation by changing the weight of the pixel value of pixels in each direction in accordance with the slope of pixel value of each pixel in two different directions near the interpolated pixel GX. For example, pixel interpolation is accomplished by increasing the weight of the pixel values in the direction of the smallest slope, and reducing the weight of the pixel values in the direction of the largest slope.

Consequently, in the case of Bayer array type image data, pixel interpolation can be accomplished without large fluctuation in pixel values of interpolated pixels when taking repeated photographs under identical conditions even if there is variation in image data due to the influence of noise and the like, thereby avoiding marked changes in the condition of the images including halftones, color matching, and edge shape.

As can be readily understood from the preceding description, the pixel interpolation device and pixel interpolation method of the present invention accomplishes pixel interpolation by changing the weight of the pixel value of pixels in each direction in accordance with each slope of pixel values of the pixels in a plurality of different directions, specifically, two different directions, surrounding the interpolated pixel. For example, since the weight of pixel values of each pixel in the same direction as the calculated slope is set so as to be inversely proportional to the slope of said direction, i.e., since the weight is increased for the pixel value of pixels in the direction of smallest slope and the weight is reduced for the pixel values of pixels in the direction of largest slope, in the case of Bayer array type image data, pixel interpolation can be accomplished without large fluctuation in pixel values of interpolated pixels when taking repeated photographs under identical conditions even if there is variation in image data due to the influence of noise and the like, thereby avoiding marked changes in the condition of the images including halftones, color matching, and edge shape.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A pixel interpolation device comprising:
    a slope calculation device to calculate within an array of image data a slope of pixel values for each of a plurality of directions;
    a pixel weight calculation device to calculate a weight to be given to pixel values in each of said plurality of directions based on said slopes of pixel values calculated by said slope calculation device; and
    an interpolation device to interpolate a value for an interpolated pixel using said pixel values and said pixel weights calculated by said pixel weight calculation device, said interpolated pixel having no pixel value prior to interpolation of a value therefor by said interpolation device.

2. The pixel interpolation device according to claim 1, wherein said slope calculation device calculates within the array of image data a first slope of pixel values in a first direction and a second slope of pixel values in a second direction transverse to said first direction.

3. The pixel interpolation device according to claim 2, wherein said pixel weight calculation device computes a first pixel weight based on said first slope of pixel values, and computes a second pixel weight based on said second slope of pixel values.

4. The pixel interpolation device according to claim 2, wherein said pixel weight calculation device compares said first slope of pixel values and said second slope of pixel values to determine a larger and smaller thereof, and computes a greater pixel weight corresponding to the direction of smaller slope and a lesser pixel weight corresponding to the direction of larger slope.

5. The pixel interpolation device according to claim 1, wherein said weight given to pixel values in each of said plurality of directions is inversely proportional to the slope of pixel values in each of said plurality of directions.

6. The pixel interpolation device according to claim 1, wherein said image data is in a Bayer array format.

7. A pixel interpolation device comprising:
    a slope calculation device for calculating within an array of image data a slope of pixel values for each of a plurality of directions;
    a pixel weight calculation device for calculating a weight to be given to pixel values in each of said plurality of directions based on said slopes of pixel values calculated by said slope calculation device; and
    an interpolation device for interpolating a value of an interpolated pixel using said pixel values and said pixel weights calculated by said pixel weight calculation device;
        wherein said slope calculation device calculating within the array of image data a first slope of pixel values in a first direction and a second slope of pixel values in a second direction;
        said pixel weight calculation device computing a first pixel weight based on said first slope of pixel values and computing a second pixel weight based on said second slope of pixel values, said first and second pixel weights being approximately inversely proportional to the respective slopes of pixel values in each of said first and second directions, and said first and second pixel weights each being greater than zero and less than or equal to one; and
        said interpolation device interpolating a value of an interpolated pixel by bidirectional weighted average of pixel values, said pixel values averaged in said first direction and said second direction each being weighted by said first and second pixel weights respectively.

8. A pixel interpolation device comprising:
    an image data generation device to generate color separated image data corresponding to a plurality of colors by color separation of inputted image data, said inputted image data being in a Bayer array format;
    a slope calculation device to calculate within said color separated image data a plurality of slopes of pixel values, one of said plurality of slopes of pixel values corresponding to each of a plurality of directions; and an interpolation device to generate interpolated data from said color separated image data, said interpolated data being generated by multi-directionally weighting pixel values of said color separated image data in said plurality of directions, a weighting of pixel values in each one of said plurality of directions being in approximately inverse proportion to a slope of pixel values in the corresponding direction.

9. A method of pixel interpolation comprising the steps of:

calculating within an array of image data a slope of pixel values for each of a plurality of directions;

determining a weight to be given to said pixel values in each of said plurality of directions based on said step of calculating slopes of pixel values; and interpolating a value for an interpolated pixel using said pixel values and said weights given to said pixel values in each of said plurality of directions, said interpolated pixel having no pixel value prior to interpolation of a value therefor by said step of interpolating.

10. The method of pixel interpolation of claim 9, wherein said step of calculating within an array of image data of a slope of pixel values for a plurality of directions includes calculating a first slope in a first direction and a second slope in a second direction transverse to said first direction.

11. The method of pixel interpolation of claim 10, wherein said step of determining a weight to be given to said pixel values includes comparing said first slope of pixel values and said second slope of pixel values to determine a larger and smaller thereof, and computing a greater pixel weight corresponding to the direction of smaller slope and a lesser pixel weight corresponding to the direction of larger slope.

12. A method of pixel interpolation comprising:

calculating within an array of image data a slope of pixel values for each one of a plurality of directions;

determining a weight to be given to said pixel values in each of said plurality of directions based on said step of calculating slopes of pixel values; and interpolating a value of an interpolated pixel using said image data and said weights given to said pixel values in each of said plurality of directions;

wherein said step of calculating within an array of image data a slope of pixel values for each of a plurality of directions calculates a first slope of pixel values in a first direction and a second slope of pixel values in a second direction;

wherein said step of determining a weight to be given to said pixel values in each of a plurality of directions determines a first pixel weight based on said first slope of pixel values and determines a second pixel weight based on said second slope of pixel values, said first and second pixel weights each being approximately inversely proportional to the respective slopes of pixel values in each of said first and second directions, and said first and second pixel weights each being greater than zero and less than or equal to one; and wherein said step of interpolating a value of an interpolated pixel interpolates a value of an interpolated pixel by bidirectional weighted average of pixel values, said pixel values averaged in said first direction and said second direction each being weighted by said first and second pixel weights respectively.

13. A method of pixel interpolation in accordance with claim 12, wherein said image data is in a Bayer array format.

14. An apparatus for interpolating pixels within an array of image data comprising:

a slope calculation device for calculating, for each one of a plurality of directions in said image data, a slope of pixel values;

a pixel value averaging device for computing, for each one of said plurality of directions in said image data, a pixel value average, said pixel value average being an average of pixel values along said one of said plurality of directions;

a pixel weight calculation device for calculating, for each pixel value average, a corresponding pixel weight, said pixel weight being approximately inversely proportional to the slope of said pixel values along a corresponding one of said plurality of directions;

a pixel interpolation device for interpolating a value of an interpolated pixel using said pixel value averages and said corresponding pixel weights, said pixel interpolation device interpolating a value of an interpolated pixel by computing a multi-directional weighted average of pixel value averages;

wherein the multi-directional weighted average is a weighted average of pixel value averages for each of said plurality of directions, each pixel value average being weighted by its corresponding pixel weight.

15. A pixel interpolation device in accordance with claim 14, wherein said pixel interpolation device interpolates a value for each one of a plurality of interpolated pixels; and wherein for each one of said plurality of directions, said pixel values that are averaged corresponding to pixels that lie along a line that passes through said interpolated pixel and extends along said one of said plurality of directions.

16. A pixel interpolation device comprising:

an image data generation device to generate color separated image data corresponding to a plurality of colors by color separation of inputted image data, said inputted image data being in a Bayer array format;

a slope calculation device to calculate, for each of said color separated image data, a plurality of slopes of pixel values, each one of said plurality of slopes of pixel values corresponding to pixel values along one of a plurality of directions; and an interpolation device to generate, for each of said color separated image data, interpolated data from said color separated image data, said interpolated data being generated by a multi-directional weighted average of pixel values of said color separated image data along each of said plurality of directions, a weighting of said average along each of said plurality of directions being in approximately inverse proportion to an absolute value of the corresponding slope of pixel values in that direction.

17. A method of pixel interpolation comprising:

calculating within an array of image data, for each one of a plurality of directions, an average of pixel values and a corresponding slope of pixel values;

determining, for each of said plurality of directions, a weight to be given to said average of pixel values based on said corresponding slope of pixel values; and interpolating a value of an interpolated pixel using said averages of pixel values and said weights;

wherein, for each of said plurality of directions, said weight to be given to said average of pixel values is approximately inversely proportional to the slope of pixel values in the corresponding direction; and wherein said step of interpolating a value of an interpolated pixel interpolates a value of an interpolated pixel by multi-directional weighted average of the average of pixel values, the average of pixel values for each of said plurality of directions being weighted by the corresponding weight.

18. A pixel interpolation device comprising:

a slope calculation device to calculate within an array of image data a slope of pixel values for each of a plurality of directions;

a pixel weight calculation device to calculate a weight to be given to pixel values in each of said plurality of directions based on said slopes of pixel values calculated by said slope calculation device; and an interpolation device to interpolate a value for each of a plurality of interpolated pixels, said interpolation device using said pixel values and said pixel weights calculated by said pixel weight calculation device, each of said interpolated pixels having no pixel value prior to interpolation of a value therefor by said interpolation device.

* * * * *